(No Model.) 2 Sheets—Sheet 1.

C. W. DWELLE & R. B. STAPP.
WATER GAS FURNACE.

No. 361,996. Patented Apr. 26, 1887.

WITNESSES:
R. E. Watson.
Charles W. Campbell.

INVENTORS:
Charles W. Dwelle
Robert Branham Stapp
BY
Foster & Freeman
ATTORNEYS (No Model.) 2 Sheets—Sheet 2.

C. W. DWELLE & R. B. STAPP.
WATER GAS FURNACE.

No. 361,996. Patented Apr. 26, 1887.

WITNESSES:
Q. E. Watson
Charles M. Campbell

INVENTOR
Charles W. Dwelle
Robert Branham Stapp
BY
Foster & Freeman
ATTORNEYS

UNITED STATES PATENT OFFICE.

CHARLES W. DWELLE AND ROBERT BRANHAM STAPP, OF DENVER, COLORADO, ASSIGNORS TO THE STAPP GAS LIGHT AND HEAT COMPANY, OF SAME PLACE.

WATER-GAS FURNACE.

SPECIFICATION forming part of Letters Patent No. 361,996, dated April 26, 1887.

Application filed January 14, 1886. Serial No. 188,594. (No model.)

*To all whom it may concern:*

Be it known that we, CHARLES W. DWELLE and ROBERT BRANHAM STAPP, citizens of the United States, residing at Denver, county of Arapahoe, and State of Colorado, have invented certain new and useful Improvements in Water-Gas Furnaces, of which the following is a specification.

Our invention relates to improvements in that class of furnaces known to the art as "water-gas furnaces," and has for its object, mainly, the construction of a furnace, substantially as hereinafter described, which will more economically produce the kind of gas known as "water-gas," and which is composed of a combination of hydrogen gas produced from the decomposition of superheated steam, together with carbonic-oxide or CO gas and gas produced from coal-oil, or hydrocarbon gas generated from petroleum or any of its products by distillation and decomposition by intense heat sufficient to fix the same as a permanent gas. It is also designed to render such a furnace capable of being economically used for the generation of carbonic-oxide gas alone, if desired, or in combination with oil-gas, as well as for the combination of hydrogen, carbonic-oxide, and oil gases, as before mentioned.

Figure 1:
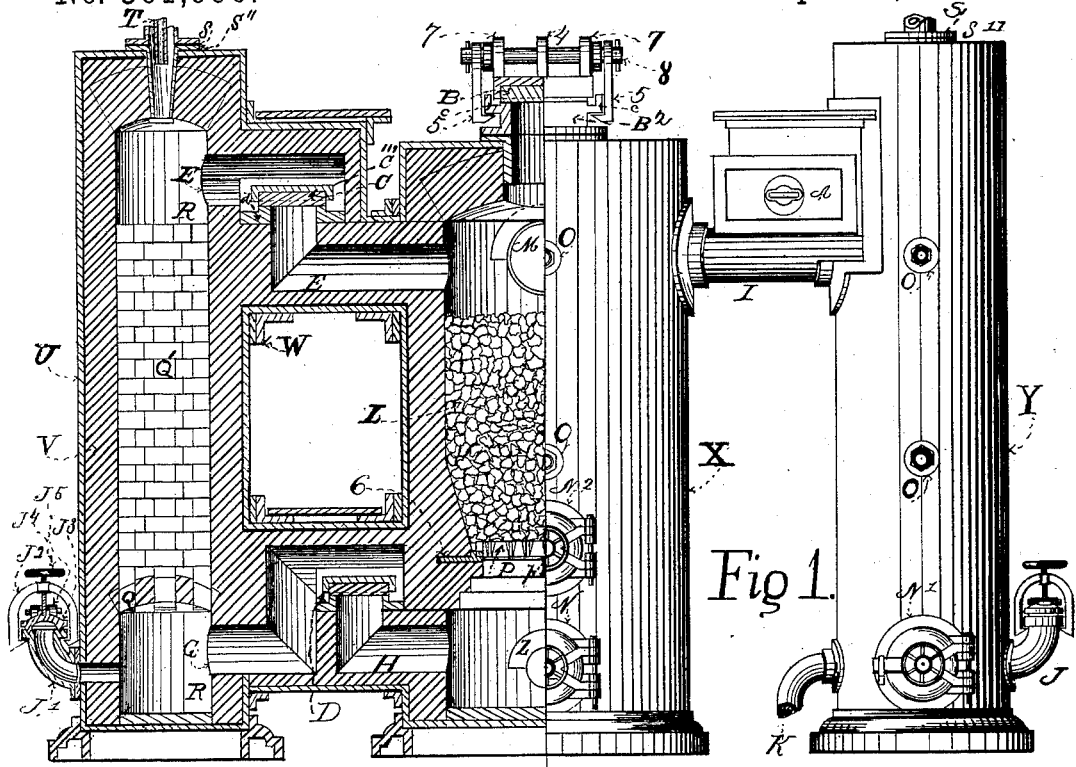
Figure 2:
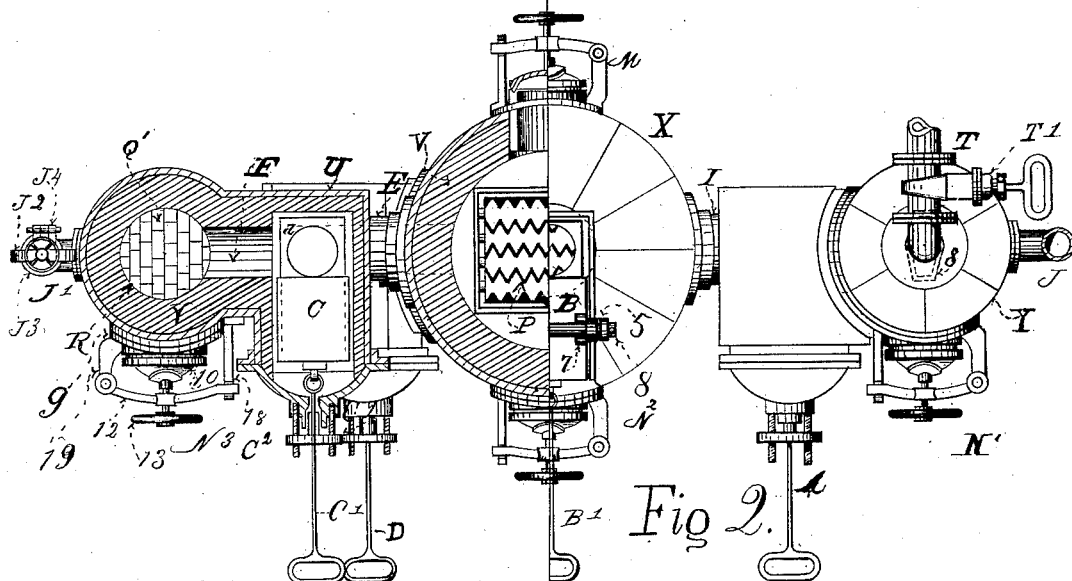
Figures 3, 4:
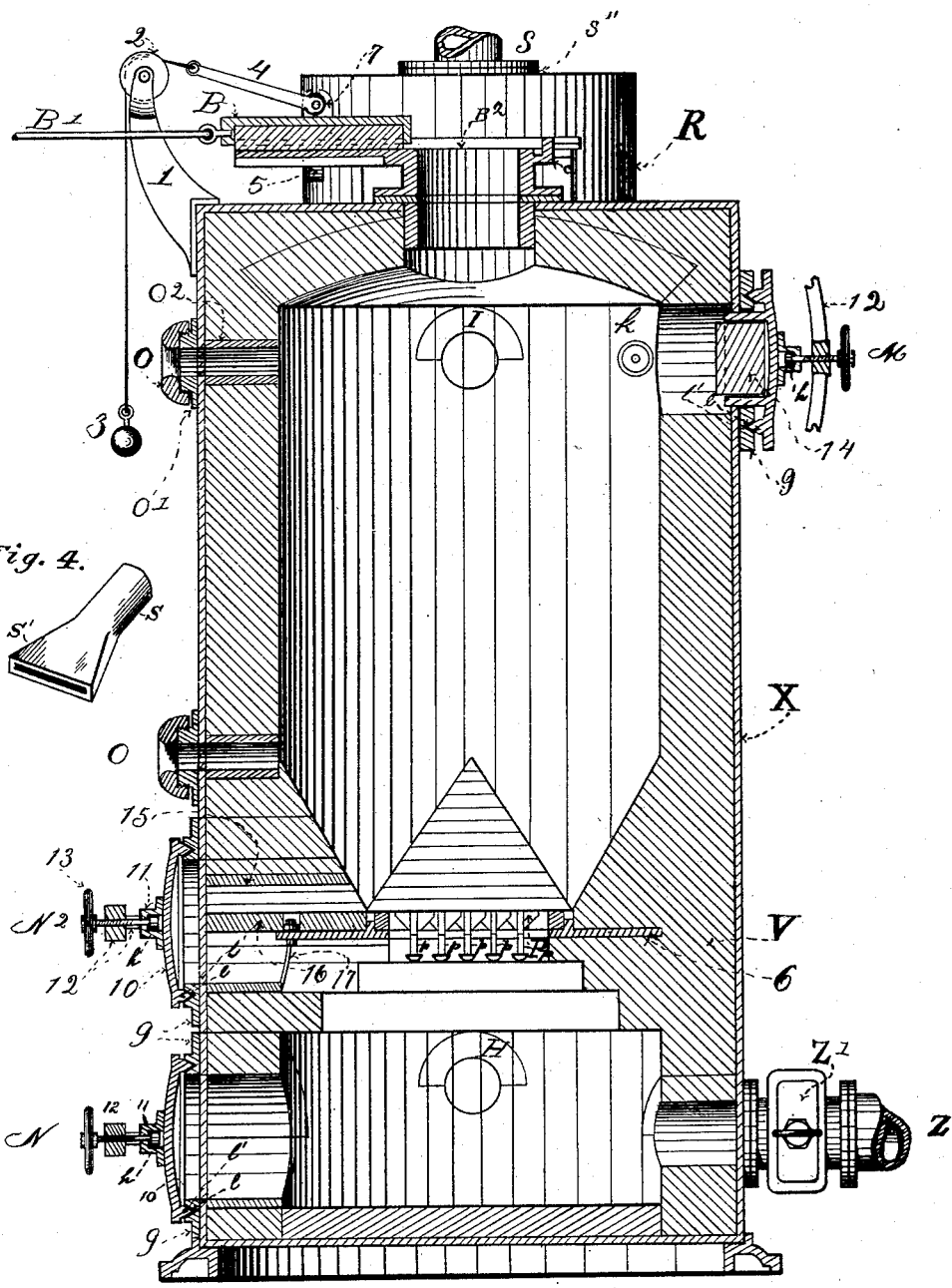

Referring to the drawings, wherein similar letters of reference denote similar parts, Figure 1 represents an elevation of the gas-generator, superheater, and fixing-chamber, showing a vertical half-section of the generator and entire vertical section of the superheater and the flues connecting said generator and superheater. Fig. 2 is a plan of the same, showing in horizontal section one-half of the generator, said section taken through the upper portion of the gas-flue leading from the generator to the superheater, and in horizontal section said superheater. Fig. 3 is a vertical section of the generator, showing the superheater in rear. Fig. 4 is a detail view of the air and steam nozzle in our improved gas-furnace.

X designates the generator, which consists in a shell of suitable metal having an interior lining of non-combustible material, and resting upon a foundation common also to a superheater and a fixing-chamber, hereinafter to be described.

We preferably contract the lower portion of said generating-chamber adjacent to the grate P, which is of less diameter than the chamber above. By this construction, as will be readily apparent, a portion of the fuel within the chamber will overlap or pass beyond the side edges of the grate, so that steam admitted below said grate shall be certainly caused to pass through and be decomposed by said fuel when incandescent. The grate P is of the rocking or shaking variety, the bars thereof being separate from each other and provided at each end with a journal having bearings within a frame, 6, which is built into the fire-brick lining V of the generator-walls. Each of said grate-bars is provided with a lug or finger, which projects downward into the ash-pit below, and is provided at its end with a button to provide means whereby said bars can be operated by a rod.

Z designates a pipe connected with an opening formed through the walls of the generator below the grate, and Z' a valve controlling the passage of air through said opening.

N designates a door which closes an opening formed through the generator-walls to the ash-pit below the grate. This door N consists of a circular concavo-convex plate or cover, 10, of metal, having its inner surface, near the edge thereof, provided with a projecting flange, 1', V-shaped in cross-section, that takes into a correspondingly-shaped groove, 1, formed in a flanged casting, 9, secured to the outer surface of the generator at the edges of the opening therethrough.

11 designates a recessed and apertured cap, which is secured to the cover or plate at the middle thereof to receive the inner end of a screw, $h$, that operates in a screw-threaded aperture formed in a bar, 12, which is hinged at one end to a stud or arm, 19, which projects from the casting 9. The door is held securely in position when closed by a hook, 18, formed on the end of a stud which projects from the casting 9 opposite to the stud 19, which hook engages with an aperture formed in the bar 12 when the door or cover 10 is in closed position.

$N^2$ designates a door similar in construction to that above described, which opens through the wall of the generator above the door N, and for the purpose of giving access to the grate above and below the same. For this purpose the door extends equal distances above and below said grate. (See Figs. 1 and 3.)

M designates a door which opens into the generating-chamber near the top thereof, and is closed by a cover or plate similar in construction and operation to those above described. This door is for the admission of fuel to the chamber.

B designates a damper or valve that closes an opening formed through the wall of the generator at the top thereof, for the passage, when desired, of the products of combustion from the generating-chamber. The damper B is provided with a shrouding, the side edges of which rest and move upon the seat $B^2$, and are held from lateral displacement by flanges $c$, which project upward from said seat at the sides thereof. The damper B is provided with the bearings 7, cast upon the back, or, in case fire-clay is used for a damper, upon the top of the shrouding surrounding the tile, which bearings contain vertical slots open at the top, if required, to receive the horizontal shaft 8, which carries the eccentric headed lever 4, having a wire rope or chain attached at its outer end and passing thence over a sheave, 2, pivoted to a suitable support and secured to a weight, 3. The shaft 8 carries a hook at either end, depending from it by means of eyes bored to fit said shaft loosely and held in place next bearings 7 by means of set-collars outside of said hooks at the opposite ends of said shaft. It will be seen by reference to the drawings that if the weight 3 is removed from the rope or chain supporting the end of eccentric lever 4 the same will drop, and the eccentric on the same will press upon the back of the valve and raise the shaft in bearing 7, and with it the hooks 5, which will catch under the flanges $c$, and thus hold the valve securely in position on its seat. To move the valve the weight must be hung to the rope or chain, thus raising the lever, which will drop the hooks 5, so that the valve or damper may be slid to the desired position by means of the rod B', when the lever 4 can be again dropped by removing the weight, thereby clamping said damper to its seat, as above described.

E designates the flue connecting the generator to the superheater, and contains a valve, C, hereinafter described, for controlling the flow of gases therethrough. This flue consists in short tubular chambers that extend for a short distance outward from the generator and superheater, respectively, and are connected at their outer ends by a vertically-extending tubular chamber, the upper end of which receives the valve C, which is made of a fire-clay tile set in a cast-iron shrouding, C''', to which is attached a rod, C', which passes through a packing-box, $C^2$, at one side of the flue for the purpose of moving said valve upon its seat, which may consist of the periphery of the fire-brick lining of the flue, or, preferably, of a single fire-clay tile bedded onto the said lining in such manner that a proper opening or hole through the same shall correspond to the diameter of the flue, as shown in plan view, Fig. 2, $d$ being the fire-clay tile used as a seat. By reference to said Fig. 2 it will be observed that the valve is moved laterally upon its bearings by its rod C', and may wholly or partially close the flue or passage E, as desired.

R designates the superheating-chamber, consisting of the shell U, lined with a fire-brick lining, V, and containing, for the purpose of raising the superheating-chamber to a high degree of heat, a perforated arch or other support, Q, of fire-brick or tile, on which rests fire-brick or other suitable material, Q', piled or stacked in the form of "checker-work," so that ample room shall be left for the passage of steam or gases around and through the same, but in such manner that the said steam or gases shall be many times diverted from a direct course, and be forced thereby into frequent contact with said brick-work in passing through it. Above this checker-work, and at the most convenient point in the superheating-chamber near where the carbonic-oxide gas generated in the generator X enters it through the flue first mentioned, a jet of air is introduced through a pipe, S, and nozzle S', either under pressure or otherwise, as may be desired.

T designates a steam-pipe leading into said air-pipe S, which in turn is connected to the air-nozzle S''. These three parts can be cast in one piece, if desired, or made separately, as shown in plan; but the steam-pipe T should discharge through the nozzle S'', in order that the steam shall keep the nozzle cool when the air is shut off, and vice versa. The shape of mouth of this air-nozzle is preferably oblong, as shown at 8 in the top of fixing-chamber Y, and in Fig. 4 with the long way at right angles to and across the axis of the flue E, in order that the air from said nozzle shall meet the incoming gas from the flue in a thin flat stream, and thereby be caused to mix the more intimately with it.

J' is an outlet-pipe to convey the products of combustion to the open air when heating the superheater. This pipe opens through the bottom of the chamber beneath the arch or support Q spoken of, and can be tightly closed, when desired, by a cap, $J^3$, hinged at $J^4$ to a projection on the pipe J', and held in proper position by a screw, $J^5$, that passes through a clamp, $J^2$, having its arms provided with hooks that take under the flanged outer end of said pipe J'.

G H designate parts of a flue for the purpose of conveying the superheated steam from the superheater to and below the grate P of the generator, in order that it may pass up through the incandescent fuel upon said grate to be converted into hydrogen gas.

D is a valve similar in construction and operation to the valve C, heretofore described, in flue E, and is used to close communication through flue G H between the generator and superheater when desired.

Y is a fixing-chamber of the ordinary construction, connected to the generator X by a flue, I, of the same construction as flue E, and containing a valve actuated by a handle, A, precisely as in the case of valve C. In the flue J of fixing-chamber Y is a discharge-opening for products of combustion when heating said fixing-chamber.

K is the main gas-pipe, leading to hydraulic seal, and thence to gas-holder.

O O O O are peep-holes for observing the conditions of working of furnace and fixing-chamber at any stage. The superheater may also have two or more of these peep-holes located at desired points. The peep-holes O are formed of flanged plates attached to the shell of the furnace, and each has an opening covered by mica held in place by a nut screwed on to a neck and flange; or the mica may be inserted between the flange and shell and held in place by the same.

An opening, $k$, is provided in the generator for an oil-pipe, in order to introduce a hydrocarbon oil for enriching the gas from the generator.

The operation of the furnace is as follows, viz: A fire being started on the grate P, the damper B is opened, the valves in flues E, G, H, and I and all the doors are closed, and the fire blown up until thoroughly started by means of an air-blast through opening Z. At this stage damper B is moved over $B^2$ to close the opening, when valves in flues E and I are opened, the one in G H remaining closed, and the caps of outlets J and J' removed. A blast or current of air is now introduced into the chambers R and Y through the nozzles S'', meeting the hot gases from the generator X and intensely heating the superheater R and its checker-work Q', as also the fixing-chamber Y. At this stage the air is shut off at Z, the outlets J J' are closed, the valve in flue E closed and the valves in flues G, H, and I opened, and the air shut off from S S'' of the fixing-chamber. If it is desired to make carbonic-oxide gas only, air is then blown into the superheater through its air-nozzle S'', which air becomes highly superheated in passing through the checker-work Q', and is introduced underneath the grate and incandescent fuel in the generator X, passing up through the fuel, meeting at a point above said fuel, if desired, hydrocarbon oil, which is introduced at the opening $k$, Fig. 3, to enrich the carbonic-oxide gas so formed. The combined gases pass through the pipe I into the fixing-chamber Y, and thence through the main K to the holder. Should it be desired to generate hydrogen gas, the air is not admitted into the superheater, but the valve of the pipe S S'' is kept closed and steam is turned into the superheater through the opening T, passing through the chamber R and its checker-work Q' and flue G H to the generator, as before, the steam in this case becoming decomposed and giving up its oxygen in passing up through the incandescent fuel, and leaving the same in the form of hydrogen gas in combination with carbonic-oxide gas from the fuel. Hydrocarbon can likewise be introduced, as before, through $k$ and the gases fixed in fixing-chamber Y.

We do not claim, broadly, a chamber having air and steam inlets at the top, our invention being distinguished by the fact that we inject the air and steam vertically downward, so as to avoid counter-currents and reduce the resistance to the main current. Nor do we broadly claim the combination of a generator and a superheater or fixer, this being old, our invention relating to the specific arrangements of said parts and their auxiliaries. Nor do we claim, broadly, a cam device for fastening a valve; but

We claim—

1. A superheating-chamber provided at one end with a combined air and steam nozzle arranged to inject a blast vertically downward through said chamber, in combination with a gas-generating chamber separate from said superheating-chamber and communicating therewith at the bottom, substantially as described.

2. In combination, a generating-chamber and a superheating-chamber separate from each other, flues connecting said chambers at their upper and lower sides and provided with sliding valves to control the passage of fluid through said flues, and a combined air and steam pipe connecting with one end of said superheating-chamber and arranged to direct a blast of steam or air, separately or combined, vertically downward through said superheating-chamber to and through the generating-chamber, as and for the purpose set forth.

3. In a gas-producing furnace, the combination, with separate gas-generating, superheating, and fixing chambers, of combined air and steam blast pipes having nozzles provided with orifices of oblong shape arranged transversely to the gas passages or flues, to inject blasts transversely to said flues, substantially as described.

4. A generating-chamber having a grate of less diameter than its body, a contracted lower end adjacent to said grate, and an enlarged space or chamber below said grate, having openings for the admission of steam and air thereto, in combination with two chambers, one a superheating-chamber and the other a fixing-chamber, both connected to the said generator by flues, substantially as described.

5. In a gas-producing furnace, in combination, a gas-generating chamber having an opening at its top, a sliding valve to close said opening, an eccentric headed securing-lever turning in bearings carried by the valve, and means, substantially as described, to operate said lever, as and for the purpose specified.

6. The combination, in a gas-producing furnace, of a gas-generating chamber having an opening at its top surrounded with a flanged casting, a sliding valve thereon having upwardly-projecting lugs to receive a shaft, 8, downwardly-projecting hooked arms hanging onto said shaft, and means, substantially as described, to operate said lever to clamp said valve in position covering the opening in the generating-chamber, as and for the purpose specified.

7. The combination, in a gas-producing furnace, of a gas-generating chamber having a contracted lower end closed by a grate of less diameter than the body of said chamber, and an opening at its top for the passage of the products of combustion, a flanged casting surrounding said opening, a sliding valve bearing upon said casting, a shaft arranged transversely of said valve, bearings for said shaft, an eccentric headed lever secured to said shaft, hooked arms pivoted to said shaft, and a weighted cord or chain, substantially as described.

8. In a gas-producing furnace, a generating-chamber having an opening at its top, a sliding valve therefor, and means, substantially as described, to operate said valve, a grate of less diameter than said chamber, a contracted portion adjacent to said grate, and an enlarged space below said grate, having openings thereto, in combination with a superheating-chamber separate from said generating-chamber and provided with a checker-work of refractory material, a blast device arranged at one end and adapted to direct a blast longitudinally therethrough, flues connecting said generating and superheating chambers, and valves within said flues having operating mechanism, substantially as described.

9. In apparatus for the manufacture of water-gas, the combination, with a fixing-chamber and a superheating-chamber provided with checker-work of refractory material and combined air and steam nozzles arranged to directs blasts to and through said checker-work, of a generating-chamber separate from said fixing and superheating chambers and connected thereto by flues having valves, substantially as described, said generating-chamber having an opening at its top closed by a sliding valve, and an eccentric headed lever connected therewith, mechanism, substantially as described, to lock said valve, a grate of less diameter than the body of said chamber, a contracted lower end adjacent to said grate, an enlarged space or chamber below said grate, and openings to admit air and steam to said enlarged space, as and for the purpose specified.

In testimony whereof we have signed our names to this specification in the presence of two subscribing witnesses.

CHARLES W. DWELLE.
    ROBERT BRANHAM STAPP.

Witnesses:
    CHARLES M. CAMPBELL,
    R. E. WATSON.